US012573118B2

(12) United States Patent
Gelb et al.

(10) Patent No.: US 12,573,118 B2
(45) Date of Patent: Mar. 10, 2026

(54) ATOMIC STREAMING OF VIRTUAL OBJECTS

(71) Applicant: Roblox Corporation, San Mateo, CA (US)

(72) Inventors: Daniel G. Gelb, Redwood City, CA (US); Val Gorbunov, Seattle, WA (US); George Elkoura, San Mateo, CA (US); Taylor Russ, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 144 days.

(21) Appl. No.: 18/541,859

(22) Filed: Dec. 15, 2023

(65) Prior Publication Data

US 2025/0078371 A1      Mar. 6, 2025

Related U.S. Application Data

(60) Provisional application No. 63/536,654, filed on Sep. 5, 2023.

(51) Int. Cl.
*G06T 13/00*          (2011.01)
*G06T 7/62*           (2017.01)
*G06T 11/20*          (2006.01)

(52) U.S. Cl.
CPC ............... *G06T 13/00* (2013.01); *G06T 7/62* (2017.01); *G06T 11/206* (2013.01)

(58) Field of Classification Search
CPC . G06T 13/00; G06T 7/62; G06T 11/00; G06T 11/206
See application file for complete search history.

(56) References Cited

U.S. PATENT DOCUMENTS 5,909,218 A * 6/1999 Naka ................ H04N 21/44012
                                                375/E7.006
10,740,957 B1 * 8/2020 McElroy ............... A63F 13/355
(Continued)

OTHER PUBLICATIONS

Hijiri, Toshiki, et al. "A spatial hierarchical compression method for 3D streaming animation." Proceedings of the fifth symposium on Virtual reality modeling language (Web3D-VRML). 2000. (Year: 2000).*

(Continued)

*Primary Examiner* — Daniel F Hajnik
(74) *Attorney, Agent, or Firm* — IP Spring

(57) ABSTRACT

Implementations described herein relate to methods, systems, and computer-readable media to render virtual objects on a client device. In some implementations, the method includes obtaining a plurality of virtual objects associated with a virtual experience, for each virtual object of the plurality of virtual objects: determining physical connections of the virtual object to one or more other virtual objects in the virtual experience, and determining logical associations of the virtual object to one or more other virtual objects in the virtual experience, forming streaming sets of virtual objects, wherein for streaming sets that include two or more virtual objects, each virtual object within the streaming set has one or more of a physical connection and a logical association with at least one other virtual object in the streaming set, and rendering virtual objects included in one or more streaming sets in the virtual experience on the client device.

19 Claims, 10 Drawing Sheets

(56) References Cited

U.S. PATENT DOCUMENTS

2018/0197318 A1 *  7/2018  Powell .................... G06T 13/20
2023/0410397 A1 *  12/2023  Wang ..................... G06N 3/042

OTHER PUBLICATIONS

C++ Standard Library headers, https://en.cppreference.com/w/cpp/
header, 2023, 6 pages.
Graph theory, https://en.wikipedia.org/wiki/Graph_theory, 16 pages.

* cited by examiner

100

310
315
320
330
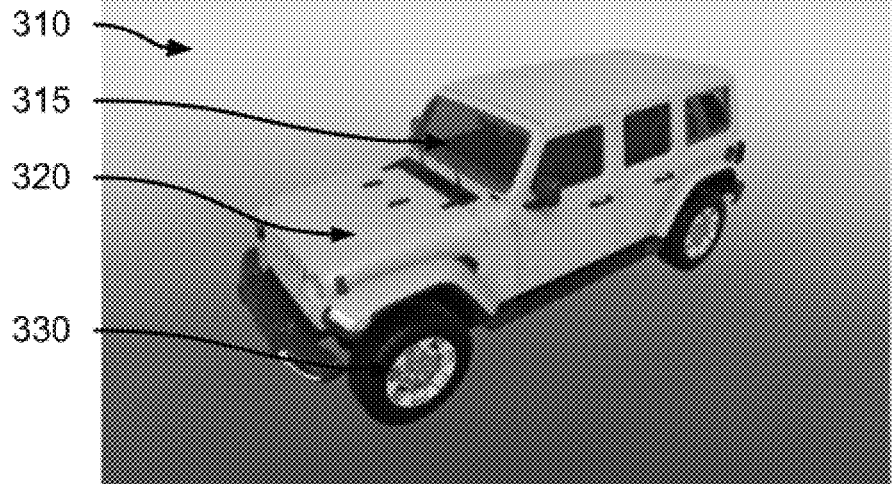
350
360
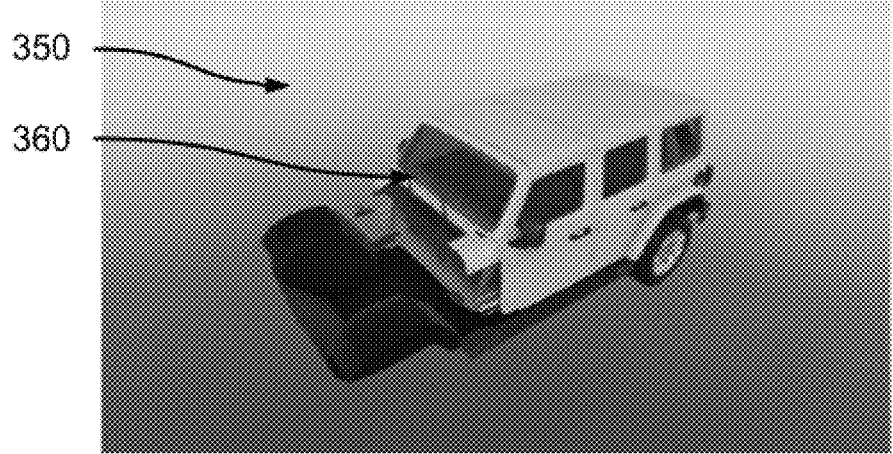
FIG. 3

500

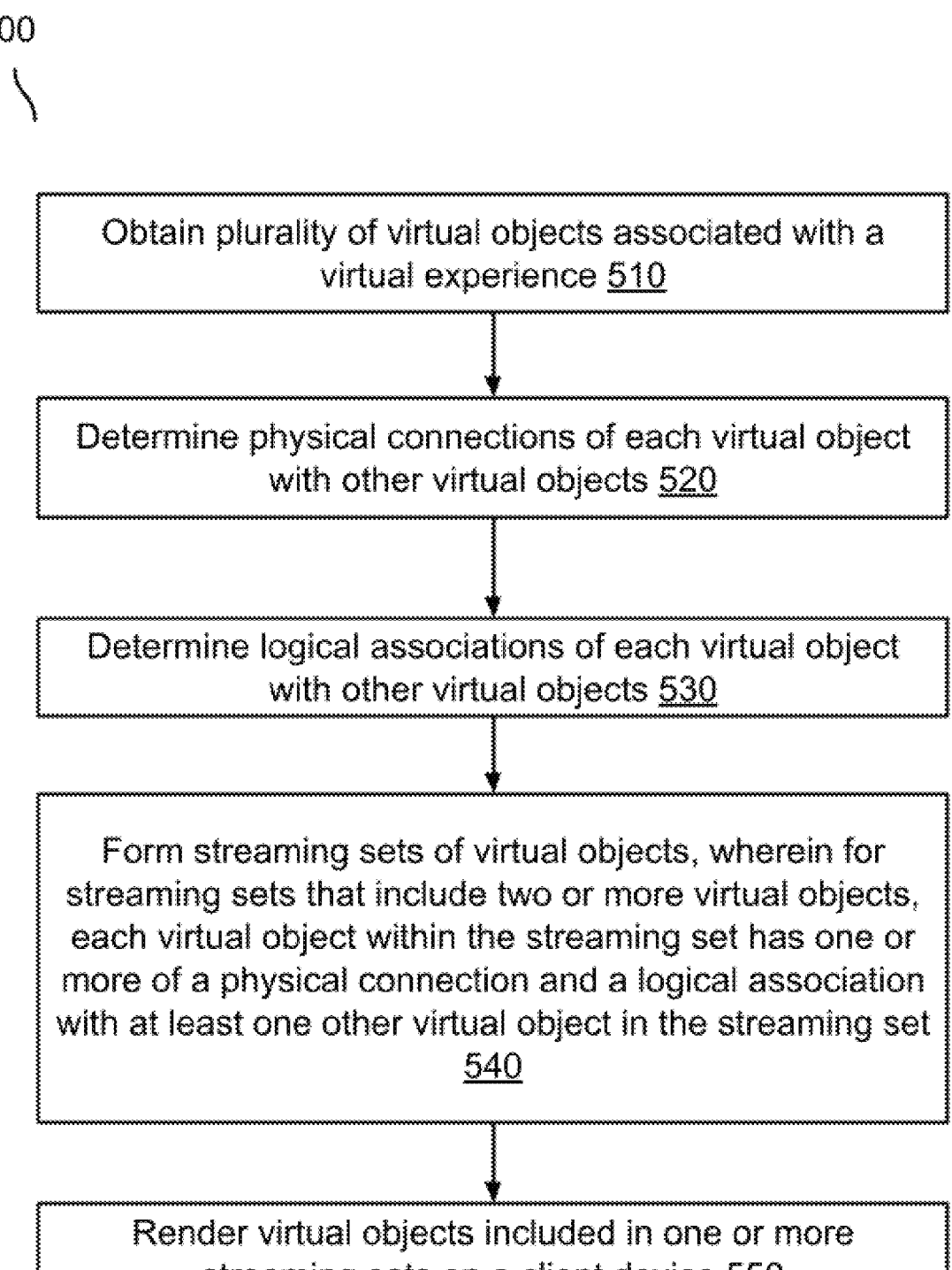

Obtain plurality of virtual objects associated with a virtual experience 510

Determine physical connections of each virtual object with other virtual objects 520

Determine logical associations of each virtual object with other virtual objects 530

Form streaming sets of virtual objects, wherein for streaming sets that include two or more virtual objects, each virtual object within the streaming set has one or more of a physical connection and a logical association with at least one other virtual object in the streaming set 540

Render virtual objects included in one or more streaming sets on a client device 550

Obtain plurality of virtual objects associated with a virtual experience 610

Generate edge sets of virtual objects 620

Generate node sets of virtual objects 630

Collect one or more intersecting edges within node sets 640

Merge node sets using edge sets to form streaming sets of virtual objects 650

Render streaming sets of virtual objects 660

7

ATOMIC STREAMING OF VIRTUAL OBJECTS

CROSS-REFERENCE TO RELATED APPLICATIONS

This application claims the benefit of priority to U.S. Provisional Application No. 63/536,654, filed on Sep. 5, 2023 and titled ATOMIC STREAMING OF VIRTUAL OBJECTS, the entire contents of which are hereby incorporated by reference herein.

TECHNICAL FIELD

Implementations relate generally to streaming of virtual objects in a virtual environment, and specifically to streaming of virtual objects over a computing network.

BACKGROUND

Some online virtual experience platforms allow users to connect with each other, interact with each other (e.g., within a virtual experience), create virtual experiences, and share information with each other via the Internet. Users of online virtual experience platforms may participate in multiplayer environments (e.g., in virtual three-dimensional environments), design custom environments, design characters and avatars, design, simulate, or create animation routines that are utilized within the environments, decorate avatars, exchange virtual items/objects with other users, and so forth. Users may utilize audio, video, and other digital content to enhance the virtual experience.

User generated content (UGC) can include complicated mechanisms and characters that are constructed from simpler virtual objects. For example, a virtual motorcar may be constructed from multiple virtual objects that are parts of the car, e.g., wheel assembly, car body, bonnet, etc. Similarly, a virtual character (e.g., an avatar) may be constructed from a combination of body parts and body joints. While the mechanisms and virtual characters in a virtual experience are tracked internally by a virtual experience platform as a collection of individual virtual objects, to a developer user or participant user of a virtual experience, each collection of virtual objects represents a higher level grouping of the constituent virtual objects that carry a particular logical meaning to the user.

Virtual platforms can utilize a server-client architecture to implement virtual experiences in order to facilitate a large number of users who may be geographically dispersed to participate in a virtual experience that can be accessed from their individual computing (client) devices. The virtual experience may be implemented such that virtual objects and environments are streamed to individual client devices from a server device. Dynamic changes in the state of virtual objects in the virtual environment during participation in a virtual experience can pose a challenge to the accurate and context sensitive streaming of virtual objects.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method to render one or more virtual objects on a client device. The computer-implemented method also includes obtaining a plurality of virtual objects associated with a virtual experience; for each virtual object of the plurality of virtual objects: determining physical connections of the virtual object to one or more other virtual objects in the virtual experience, and determining logical associations of the virtual object to one or more other virtual objects in the virtual experience. The method also includes forming streaming sets of virtual objects, where for streaming sets that include two or more virtual objects, each virtual object within the streaming set has one or more of a physical connection and a logical association with at least one other virtual object in the streaming set; and rendering virtual objects included in one or more streaming sets in the virtual experience on the client device. Other embodiments of this aspect include corresponding computer systems, apparatus, and computer programs recorded on one or more computer storage devices, each configured to perform the actions of the methods.

The computer-implemented method may include transmitting, from a server device, the one or more streaming sets to the client device. The computer-implemented method may include determining the one or more streaming sets to be transmitted to the client device based on a determination that at least one virtual object in each of the one or more streaming sets is positioned within a streaming region of the client device. Transmission of the one or more streaming sets may include transmitting the one or more streaming sets such that all virtual objects included in the one or more streaming sets are transmitted to the client device. Determining the physical connections of the virtual object to the one or more other virtual objects in the virtual experience may include identifying a network ownership unit defined to perform physics simulation of the virtual object and the one of more other virtual objects. Determining logical associations of the virtual object to the one or more other virtual objects in the virtual experience may include determining a particular atomic model associated with the virtual object. The computer-implemented method may include: performing a comparison of virtual objects included in the one or more streaming sets transmitted to the client device with virtual objects stored in a memory of the client device to determine one or more streamed out virtual objects; determining, based on the comparison, that the one or more virtual objects previously stored in the memory of the client device are not included in the streaming set; and based on the determination, removing the one or more streamed out objects from the memory of the client device. The computer-implemented method may include determining the spatial volume for each streaming set that circumscribes the virtual objects included in the corresponding streaming set. The graph includes logically associated virtual objects as respective nodes of the graph and the physically connected virtual objects as respective edges. The computer-implemented method may include: identifying overlapping virtual objects in the graph by performing a depth first transversal; and merging the overlapping virtual objects. The virtual objects may include one or more of parts, scripts, models, images, and sound objects. Implementations of the described techniques may include hardware, a method or process, or computer software on a computer-accessible medium.

One general aspect includes a non-transitory computer-readable medium with instructions stored thereon that responsive to execution by a processing device, cause the processing device to perform operations comprising obtaining a plurality of virtual objects associated with a virtual experience; for each virtual object of the plurality of virtual objects: determining physical connections of the virtual object to one or more other virtual objects in the virtual experience, and determining logical associations of the virtual object to one or more other virtual objects in the virtual experience. The operations also include forming streaming sets of virtual objects, where for streaming sets that include two or more virtual objects, each virtual object within the streaming set has one or more of a physical connection and a logical association with at least one other virtual object in the streaming set; and rendering virtual objects included in one or more streaming sets in the virtual experience on a client device. Other embodiments of this aspect include corresponding computer systems, apparatus, and computer programs recorded on one or more computer storage devices, each configured to perform the actions of the methods.

The operations further may include transmitting, from a server device, the one or more streaming sets to the client device. The operations further may include determining the one or more streaming sets to be transmitted to the client device based on a determination that at least one virtual object in each of the one or more streaming sets is positioned within a streaming region of the client device. Transmission of the one or more streaming sets may include transmitting the one or more streaming sets such that all virtual objects included in the one or more streaming sets are transmitted to the client device. Determining the physical connections of the virtual object to the one or more other virtual objects in the virtual experience may include identifying a network ownership unit defined to perform physics simulation of the virtual object and the one of more other virtual objects. Determining logical associations of the virtual object to the one or more other virtual objects in the virtual experience may include determining a particular atomic model associated with the virtual object. Implementations of the described techniques may include hardware, a method or process, or computer software on a computer-accessible medium.

One general aspect includes a system that includes a memory with instructions stored thereon; and a processing device, coupled to the memory, the processing device configured to access the memory and execute the instructions, where the instructions cause the processing device to perform operations including: obtaining a plurality of virtual objects associated with a virtual experience; for each virtual object of the plurality of virtual objects: determining physical connections of the virtual object to one or more other virtual objects in the virtual experience; and determining logical associations of the virtual object to one or more other virtual objects in the virtual experience; forming streaming sets of virtual objects, where for streaming sets that include two or more virtual objects, each virtual object within the streaming set has one or more of a physical connection and a logical association with at least one other virtual object in the streaming set; and rendering virtual objects included in one or more streaming sets in the virtual experience on the client device. Other embodiments of this aspect include corresponding computer systems, apparatus, and computer programs recorded on one or more computer storage devices, each configured to perform the actions of the methods.

In some implementations, the virtual objects may include one or more of parts, scripts, models, images, and sound objects. The operations further may include constructing a graph that represents the plurality of virtual objects, where the graph includes logically associated virtual objects as respective nodes of the graph and the physically connected virtual objects as respective edges. Implementations of the described techniques may include hardware, a method or process, or computer software on a computer-accessible medium.

BRIEF DESCRIPTION OF DRAWINGS

FIG. 3 depicts examples of accurately and inaccurately streamed virtual objects, in accordance with some implementations.

FIG. 5 is a flowchart that illustrates an example method to render virtual objects in a virtual experience, in accordance with some implementations.

DETAILED DESCRIPTION

Figure 1:
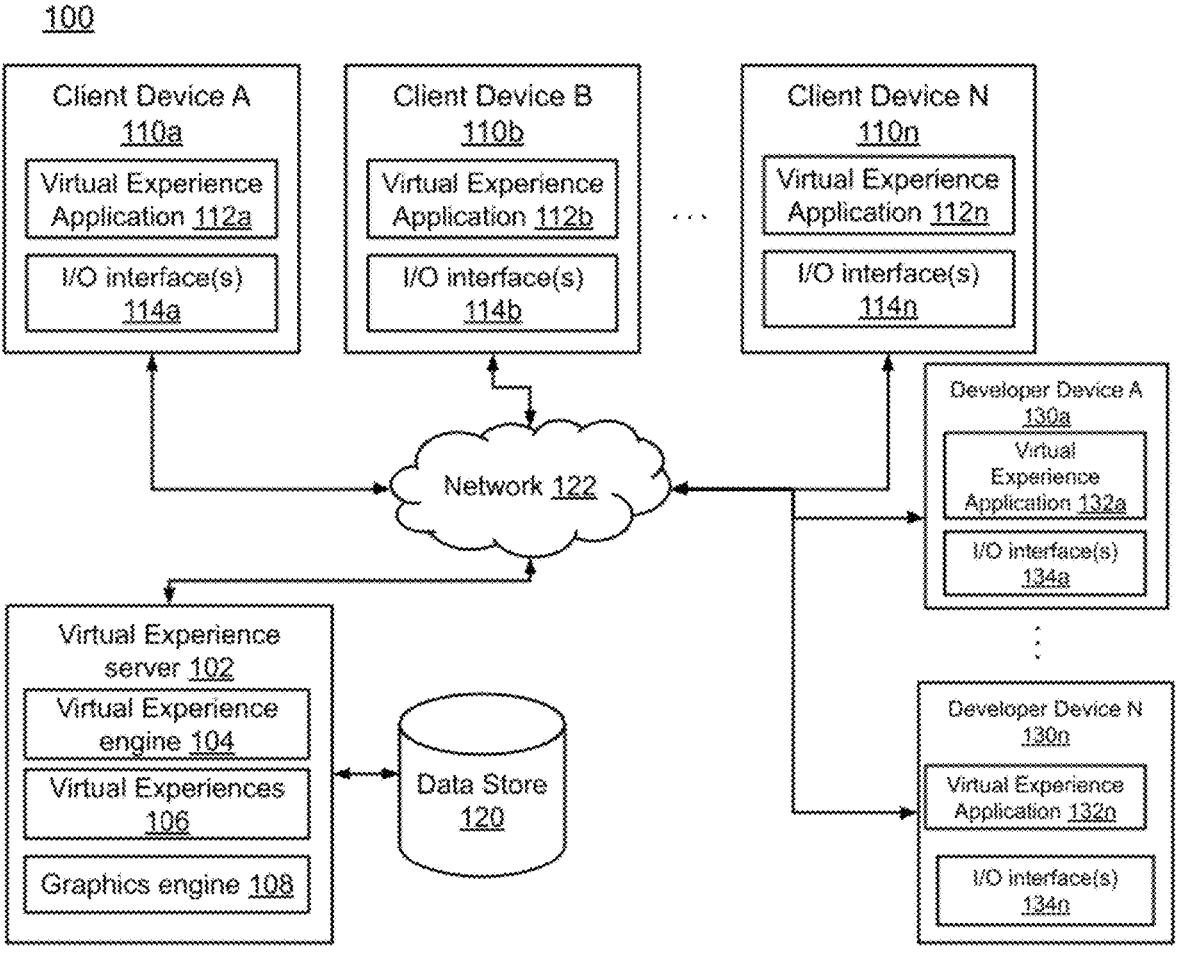
FIG. 1 is a diagram of an example system architecture for simulation of rigid body objects, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

Virtual experience platforms (also referred to as "user-generated content platforms" or "user-generated content systems") offer a variety of ways for users to interact with one another. For example, users of a virtual experience platform may work together towards a common goal, share various virtual objects, send electronic messages to one another, and so forth. Users of a virtual experience platform may join virtual experiences as virtual characters, playing specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single user is part of a virtual experience.

The virtual experience platform may also enable users of the platform to create and animate new characters, avatars, vehicles, planes, etc. For example, users of the virtual experience platform may be enabled to create, design, and customize new virtual characters (avatars) and mechanisms.

Participants (Users) in a virtual experience can utilize a variety of devices to participate in the virtual experience; the devices commonly have different capabilities in terms of device memory capacity, device processing speed, device screen size, etc.

In order to provide a superior user experience, the virtual experience platform may enable in-experience content streaming. In-experience content streaming may enable the virtual experience platform, e.g., by utilizing a virtual experience engine, to dynamically load and unload three dimensional (3D) and other content on specific client devices. The loading and unloading of content, e.g., virtual objects, terrain, etc. may be based on a particular context of a participating user, e.g., a position of a virtual character associated with the player in the virtual universe, regions of interest in the virtual universe to the participating player, etc.

In-experience streaming can improve the overall player experience in several ways as well provide technical advantages. The advantages include:

Faster join times: Participants (e.g., players in an online game) can join a game and start playing in one part of the virtual universe (virtual world) while the remainder of the virtual world loads as a background process Memory efficiency: Participants of virtual experiences can utilize computing devices with less memory since the virtual content is dynamically streamed in and out. Devices with greater capabilities, e.g., memory can be provided with more immersive and detailed content.

Improved performance: The virtual experience can support better frame rates and performance, since the server can spend less time and bandwidth synchronizing changes between the world and the participants in the world.

Customized level of detail: Distant virtual objects (e.g., models) and terrain remain visible even when not being streamed to clients, thereby keeping the virtual experience optimized for performance without entirely sacrificing background visuals.

In some implementations, a memory requirement of a client device can be reduced by between about 50%—about 80% by enabling streaming. Additionally, join times, e.g., the time taken for a virtual experience to be initialized on a client device may be reduced by up to 80%.

The streaming content is provided to client devices over a network, and virtual objects in a virtual universe may be synchronized over the network in a pull mode or a push mode. In a push mode synchronization, a server device may push (transmit) a set of virtual objects that is to be rendered on a particular client device to the particular client device. In a pull mode synchronization, a client device may obtain a set of virtual objects that are to be rendered and their respective states by polling, e.g., via an application program interface (API), a server, database, etc.

In some implementations, based on information received from a client device regarding its position (or a position of an avatar associated with the client device) in a virtual environment, the server may transmit suitable virtual objects (instances) associated with different virtual regions proximate to the virtual location associated with the client device.

In some implementations, the streaming content may be continually updated to client devices based on changes to virtual objects that occur within the virtual environment. For example, in a scenario where a script written by a developer triggers a change to the color of a car wheel on a server device, the server device may push the update of the color to one or more clients that may have the car streamed in.

Similarly, in a scenario where on a client device that is an authoritative owner of a motor car, the velocity of a car undergoes a change, an updated position about the car may be transmitted to the server device and to one or more client devices.

In some implementations, the set of virtual objects to be rendered locally on the client device are stored in a workspace (memory) of the client device, which serves as a repository to hold virtual objects that exist in the 3D world. The contents of the workspace (memory) are updated, e.g., as virtual objects move around within the virtual environment, as virtual objects get destroyed within the virtual environment, as new virtual objects get added to the virtual environment, etc. At suitable times, e.g., corresponding to a refresh rate, a display screen of the local device may be updated based on an updated state of the virtual objects in the workspace (memory) of the client device.

Streaming and local rendering of virtual objects may not be limited to display of virtual objects. For example, in some implementations, rendering of virtual objects may include playback of a sound (e.g., where a virtual object corresponds to a sound file), application of a texture on a virtual object (e.g., where a virtual object corresponds to an image), execution of a script locally on the client device (e.g., where a virtual object corresponds to a script), etc.

Streaming the virtual objects as individual objects (instances) over a network can lead to behavior problems during the virtual experience (e.g., gameplay). In some scenarios, individual streaming of virtual objects may complicate the programming model that developers may have to utilize.

In some implementations, the virtual experience can include virtual representations of players, non player characters (NPCs), tools, accessories, assemblies, mechanisms etc., that are displayed on client (local) devices. In some implementations, the virtual representations may be user generated content that is uploaded to the virtual experience platform and made available to other developer users for use.

Accordingly, the user generated content, e.g., virtual objects may have a high degree of variability in terms of their associations with other virtual objects, and may not always be evaluated by the virtual experience platform to verify accuracy of their associations.

If client devices are only provided with updates to virtual objects that are positioned in areas of the virtual environment (e.g., game world) that are proximate to their avatar, updates to virtual objects that are critical may be omitted. For example, a long train in a virtual environment may span a very large area of the virtual environment. In an example scenario, the client device may be provided with updates to the caboose of the train, but not the engine of the train because the engine is positioned relatively further away from the client device. In such a scenario, if physics simulations are performed at the client device for the incompletely constructed train, incorrect results may be obtained.

In some implementations, users are provided with an option to designate logical associations between virtual objects by specifying (labeling) a set of virtual objects to be an atomic model. In some implementations, an atomic model is a container object that is utilized to group together a set of virtual objects. The atomic model may further include a definition of a hierarchy of virtual objects that comprise the atomic model, and may additionally be related to one or more other atomic models.

Content streaming dynamically loads and unloads virtual objects in models on a client device (e.g., a player's device in a game) as their virtual character explores the virtual world. With streaming enabled, a manner in which each model should be treated under streaming behavior can be specified. For example, models specified to be persistent may never be streamed out; models specified to be atomic may stream in and out as a single unit along with all of its descendants.

In order to support complex physical mechanisms while also aiming to provide a smooth and responsive experience for participants, e.g., players, a physics engine may be utilized that includes a distributed physics solver (system) in which computations (e.g., determining solutions to the equations of motion of one or more physical objects) are distributed between the server and all connected client devices (clients). Within the system, the virtual experience engine may assign network ownership of physically simulated virtual objects (e.g., BaseParts) to either a client device or server device to divide the work of calculating physics.

Clients experience more responsive physics interactions with parts that they own, since there's no latency from communication with the server. Performing physics calculations in a distributed manner by utilizing network ownership units (NOU) additionally can also improve server performance because physics computations can be split up among individual clients, enabling the server to prioritize other tasks.

In some implementations, a network ownership unit includes a plurality of physically connected objects that need to simulate together on a single authoritative client device. Assignments of a group of physically connected virtual objects to a specific device that is to act as a network owner for the group of physically connected virtual objects may be determined, e.g., at a server device.

In some implementations, accurate streaming of virtual objects may be implemented through atomic streaming of virtual objects that encompasses virtual objects that are logically associated (e.g., via atomic model definitions and/or data model definitions) and virtual objects that are physically connected (e.g., via assignment to a common network ownership unit). In some implementations, atomic streaming of virtual objects may be implemented by ensuring that virtual objects associated with all NOUs that intersect with a particular atomic model are combined into a single atomic streaming unit. In some implementations, the atomic streaming unit may be referred to as a streaming set of virtual objects.

For example, virtual objects (Instances) may be first grouped together based on implicit context, by combining physically connected virtual objects into a graph and then combining the virtual objects in the graph based on an explicit context that is derived from user/developer-defined atomic model groupings.

In some implementations, a StreamingSolver may be utilized within a virtual experience server to generate new internal structures, e.g., streaming sets (StreamingSets). Subsequently, the streaming sets are utilized as the units of logic for streaming and replication of virtual objects rather than individual virtual objects in the virtual experience.

FIG. 1 is a diagram of an example system architecture for simulation of rigid body objects, in accordance with some implementations. FIG. 1 and the other figures use like reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes virtual experience server 102, data store 120, client devices 110a, 110b, and 110n (generally referred to as "client device(s) 110" herein), and developer devices 130a and 130n (generally referred to as "developer device(s) 130" herein). Virtual experience server 102, data store 120, client devices 110, and developer devices 130 are coupled via network 122. In some implementations, client devices(s) 110 and developer device(s) 130 may refer to the same or same type of device.

Virtual experience server 102 can include, among other things, a virtual experience engine 104, one or more virtual experiences 106, and graphics engine 108. In some implementations, the graphics engine 108 may be a system, application, or module that permits the virtual experience server 102 to provide graphics and animation capability. In some implementations, the graphics engine 108 may perform one or more of the operations described below in connection with the methods illustrated in FIGS. 5 and 6. A client device 110 can include a virtual experience application 112, and input/output (I/O) interfaces 114 (e.g., input/output devices). The input/output devices can include one or more of a microphone, speakers, headphones, display device, mouse, keyboard, virtual experience controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, virtual experience controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the virtual experience server 102 can include a server having one or more computing devices (e.g., a cloud computing system, a rackmount server, a server computer, cluster of physical servers, etc.). In some implementations, the virtual experience server 102 may be an independent system, may include multiple servers, or be part of another system or server.

In some implementations, the virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the virtual experience server 102 and to provide a user with access to virtual experience server 102. The virtual experience server 102 may also include a website (e.g., a web page) or application back-end software that may be used to provide a user with access to content provided by virtual experience server 102. For example, users may access virtual experience server 102 using the virtual experience application 112 on client devices 110.

In some implementations, virtual experience session data are generated via virtual experience server 102, virtual experience application 112, and/or virtual experience application 132, and are stored in data store 120. With permission from virtual experience players, virtual experience session data may include associated metadata, e.g., virtual experience identifier(s); device data associated with the players; demographic information of the player(s); virtual experience play session identifier(s); chat transcripts; session start time, session end time, and session duration for each player; relative locations of participant avatar(s) within a virtual experience environment; in-virtual experience purchase(s) by one or more player(s); accessories utilized by virtual experience players; etc.

In some implementations, virtual experience server 102 may be a type of social network providing connections between users or a type of user-generated content system that allows users (e.g., end-users or consumers) to communicate with other users on the virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between players.

In some implementations, the chat transcripts are generated via virtual experience application 112 and/or virtual experience application 132 or and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual experience environment, accessories utilized by virtual experience participants, etc. In some implementations, the chat transcripts may include multilingual content, and messages in different languages from different virtual experience sessions of a virtual experience may be stored in data store 120.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, virtual experience server 102 may be a virtual gaming server. For example, the gaming server may provide single-player or multiplayer virtual experiences to a community of users that may access or interact with virtual experiences using client devices 110 via network 122. In some implementations, virtual experiences (also referred to as "video virtual experience," "online virtual experience," or "virtual experience" herein) may be two-dimensional (2D) virtual experiences, three-dimensional (3D) virtual experiences (e.g., 3D user-generated virtual experiences), virtual reality (VR) virtual experiences, or augmented reality (AR) virtual experiences, for example. In some implementations, users may participate in virtual experiences with other users. In some implementations, a virtual experience may be played in real-time with other users of the virtual experience.

In some implementations, virtual experiences may refer to the interaction of one or more players using client devices (e.g., 110) within a virtual experience (e.g., 106) or the presentation of the interaction on a display or other output device (e.g., 114) of a client device 110.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "gaming environments" or "virtual environments" herein) where multiple environments may be linked. An example of an environment may be a three-dimensional (3D) environment. The one or more environments of a virtual experience 106 may be collectively referred to as a "world" or "gaming world" or "virtual world" or "universe" herein. An example of a world may be a 3D world of a virtual experience 106. For example, a user may build a virtual environment that is linked to another virtual environment created by another user. A character of the virtual experience may cross the virtual border to enter the adjacent virtual environment.

Three-dimensional (3D) environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the virtual experience server 102 can host one or more virtual experiences 106 and can permit users to interact with the virtual experiences 106 using a virtual experience application 112 of client devices 110. Users of the virtual experience server 102 may play, create, interact with, or build virtual experiences 106, communicate with other users, and/or create and build objects (e.g., also referred to as "item(s)" or "virtual experience objects" or "virtual experience item(s)" herein) of virtual experiences 106.

For example, in generating user-generated virtual items, users may create characters, decoration for the characters, one or more virtual environments for an interactive virtual experience, or build structures used in a virtual experience 106, among others. In some implementations, users may buy, sell, or trade virtual experience objects, such as in-platform currency (e.g., virtual currency), with other users of the virtual experience server 102. In some implementations, virtual experience server 102 may transmit virtual experience content to virtual experience applications (e.g., 112). In some implementations, virtual experience content (also referred to as "content" herein) may refer to any data or software instructions (e.g., virtual experience objects, virtual experience, user information, video, images, commands, media item, etc.) associated with virtual experience server 102 or virtual experience applications. In some implementations, virtual experience objects (e.g., also referred to as "item(s)" or "objects" or "virtual objects" or "virtual experience item(s)" herein) may refer to objects that are used, created, shared or otherwise depicted in virtual experience applications 106 of the virtual experience server 102 or virtual experience applications 112 of the client devices 110. For example, virtual experience objects may include a part, model, character, accessories, tools, weapons, clothing, buildings, vehicles, currency, flora, fauna, components of the aforementioned (e.g., windows of a building), and so forth.

It may be noted that the virtual experience server 102 hosting virtual experiences 106, is provided for purposes of illustration. In some implementations, virtual experience server 102 may host one or more media items that can include communication messages from one user to one or more other users. With user permission and express user consent, the virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the virtual experience server

102 (e.g., a public virtual experience). In some implementations, where virtual experience server 102 associates one or more virtual experiences 106 with a specific user or group of users, virtual experience server 102 may associate the specific user(s) with a virtual experience 106 using user account information (e.g., a user account identifier such as username and password).

In some implementations, virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of virtual experience server 102, or a combination of both.

In some implementations, both the virtual experience server 102 and client devices 110 may execute a virtual experience engine (104 and 112, respectively). The virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the virtual experience server 102 and the virtual experience engine functions that are performed on the client devices 110. For example, the virtual experience engine 104 of the virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the virtual experience server 102 and client device 110 may be changed (e.g., dynamically) based on virtual experience conditions. For example, if the number of users participating in virtual experiences of a particular virtual experience 106 exceeds a threshold number, the virtual experience server 102 may perform one or more virtual experience engine functions that were previously performed by the client devices 110.

For example, users may be playing a virtual experience 106 on client devices 110, and may send control instructions (e.g., user inputs, such as right, left, up, down, user election, or character position and velocity information, etc.) to the virtual experience server 102. Subsequent to receiving control instructions from the client devices 110, the virtual experience server 102 may send virtual experience instructions (e.g., position and velocity information of the characters participating in the group virtual experience or commands, such as rendering commands, collision commands, etc.) to the client devices 110 based on control instructions.

For instance, the virtual experience server 102 may perform one or more logical operations (e.g., using virtual experience engine 104) on the control instructions to generate virtual experience instruction(s) for the client devices 110. In other instances, virtual experience server 102 may pass one or more or the control instructions from one client device 110 to other client devices (e.g., from client device 110a to client device 110b) participating in the virtual experience 106. The client devices 110 may use the virtual experience instructions and render the virtual experience for presentation on the displays of client devices 110.

In some implementations, the control instructions may refer to instructions that are indicative of in-virtual experience actions of a user's character. For example, control instructions may include user input to control the in-virtual experience action, such as right, left, up, down, user selection, gyroscope position and orientation data, force sensor data, etc. The control instructions may include character position and velocity information. In some implementations, the control instructions are sent directly to the virtual experience server 102. In other implementations, the control instructions may be sent from a client device 110 to another client device (e.g., from client device 110b to client device 110n), where the other client device generates virtual experience instructions using the local virtual experience engine 104. The control instructions may include instructions to play a voice communication message or other sounds from another user on an audio device (e.g., speakers, headphones, etc.).

In some implementations, virtual experience instructions may refer to instructions that enable a client device 110 to render scenes from a virtual experience, such as a multi-player virtual experience. The virtual experience instructions may include one or more of user input (e.g., control instructions), character position and velocity information, or commands (e.g., physics commands, rendering commands, collision commands, etc.).

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g. shoulder and hip ratio); head size; etc.

One or more characters (also referred to as an "avatar" or "model" herein) may be associated with a user where the user may control the character to facilitate a user's interaction with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g. shirts, pants, etc. the online gaming platform may provide users access to simplified 3D virtual object models that are represented by a mesh of a low polygon count, e.g. between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character virtual experience object (e.g., body parts, etc.) but the user may control the character (without the character virtual experience object) to facilitate the user's interaction with the virtual experience (e.g., a puzzle virtual experience where there is no rendered character virtual experience object, but the user still controls a character to control in-virtual experience action).

In some implementations, a component, such as a body part, may be a primitive geometrical shape such as a block, a cylinder, a sphere, etc., or other primitive shape such as a wedge, a torus, a tube, a channel, etc. In some implementations, a creator module may publish a user's character for view or use by other users of the virtual experience server 102. In some implementations, creating, modifying, or customizing characters, other virtual experience objects, virtual experiences 106, or virtual experience environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, inanimate object, or other creative form.

In some implementations, the virtual experience server 102 may store characters created by users in the data store 120. In some implementations, the virtual experience server 102 maintains a character catalog and virtual experience catalog that may be presented to users. In some implementations, the virtual experience catalog includes images of virtual experiences stored on the virtual experience server 102. In addition, a user may select a character (e.g., a character created by the user or other user) from the character catalog to participate in the chosen virtual experience. The character catalog includes images of characters stored on the virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with virtual experience server 102, such as control a virtual character in a virtual experience hosted by virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 110 and allows users to interact with virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application may be an virtual experience server application for users to build, create, edit, upload content to the virtual experience server 102 as well as interact with virtual experience server 102 (e.g., play virtual experiences 106 hosted by virtual experience server 102). As such, the virtual experience application may be provided to the client device(s) 110 by the virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with virtual experience server 102, such as control a virtual character in a virtual experience hosted by virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 130 and allows users to interact with virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application 132 may be an virtual experience server application for users to build, create, edit, upload content to the virtual experience server 102 as well as interact with virtual experience server 102 (e.g., provide and/or play virtual experiences 106 hosted by virtual experience server 102). As such, the virtual experience application may be provided to the client device(s) 130 by the virtual experience server 102. In another example, the virtual experience application 132 may be an application that is downloaded from a server. virtual experience application 132 may be configured to interact with virtual experience server 102 and obtain access to user credentials, user currency, etc. for one or more virtual experiences 106 developed, hosted, or provided by a virtual experience developer.

In some implementations, a user may login to virtual experience server 102 via the virtual experience application. The user may access a user account by providing user account information (e.g., username and password) where the user account is associated with one or more characters available to participate in one or more virtual experiences 106 of virtual experience server 102. In some implementations, with appropriate credentials, a virtual experience developer may obtain access to virtual experience objects, such as in-platform currency (e.g., virtual currency), avatars, special powers, accessories, that are owned by or associated with other users.

In general, functions described in one implementation as being performed by the virtual experience server 102 can also be performed by the client device(s) 110, or a server, in other implementations if appropriate. In addition, the functionality attributed to a particular component can be performed by different or multiple components operating together. The virtual experience server 102 can also be accessed as a service provided to other systems or devices through suitable application programming interfaces (APIs), and thus is not limited to use in websites.

Figure 2A:
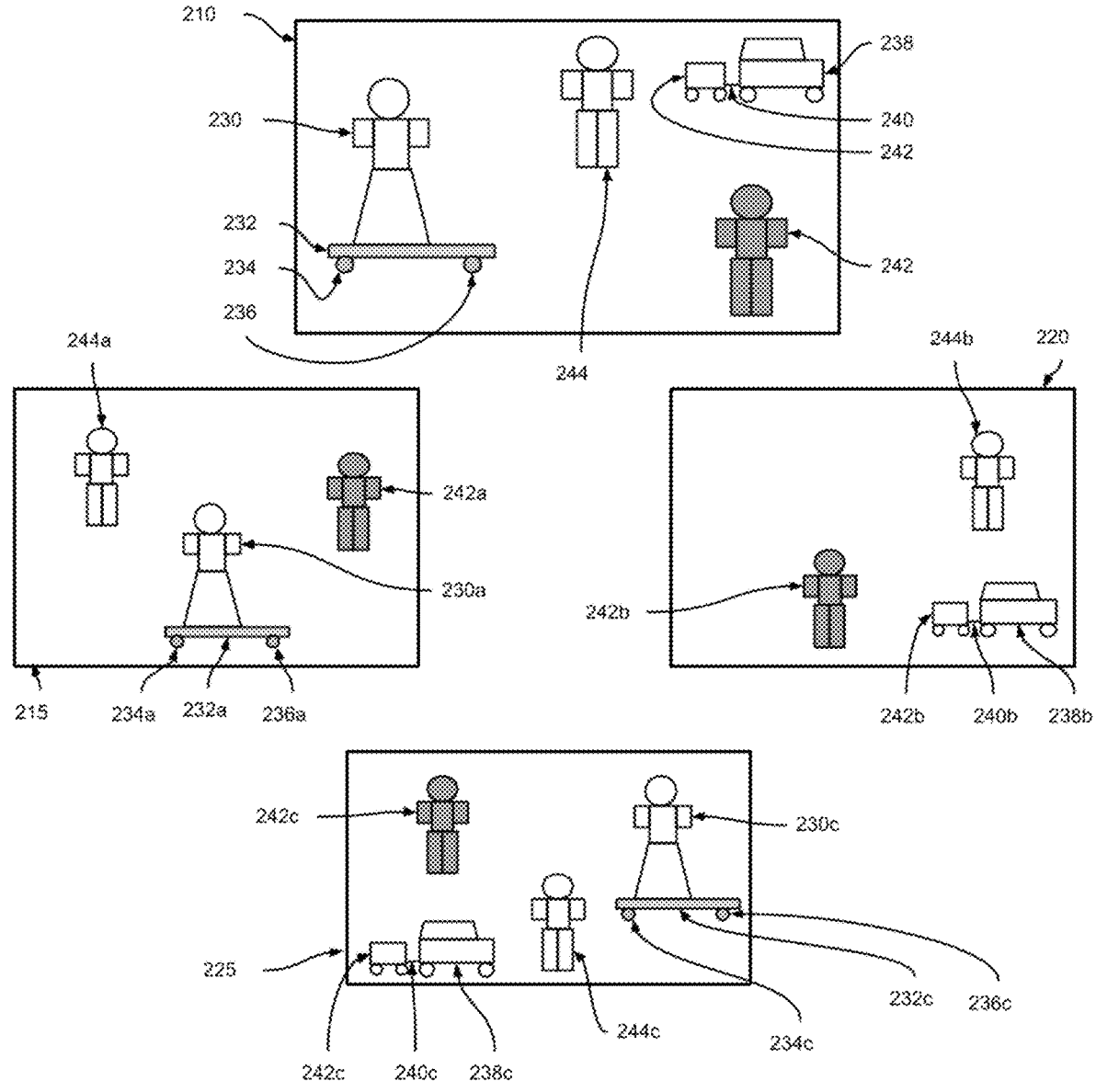
FIG. 2A depicts an example scene from a virtual experience implemented over a client-server architecture, in accordance with some implementations.

FIG. 2A depicts an example scene from a virtual experience implemented over a client-server architecture, in accordance with some implementations.

Specifically, FIG. 2A depicts a scene from a virtual experience that includes a representation of a plurality of virtual objects at a server device 210, as well as representations of the scene at respective client devices; a first client device 215, a second client device 220, and a third client device 225. Each of the client devices may be associated with different players, and who may be participating in a common virtual experience on the virtual experience platform.

As depicted in FIG. 2A, the scene includes a first character 230, a second virtual character 242, and a third virtual character 242. The scene additionally includes the first character riding on a skateboard that includes skateboard 232, first wheels 234, and second wheels 236. A cart 238 that is attached by a coupler (coupling mechanism) 240 to a wagon 242 is also depicted in FIG. 2A. The first character 230, skateboard 232, first wheels 234, and second wheels 236 may additionally be specified to be an atomic model, e.g., by a developer user to indicate that the first character, skateboard 232, first wheels 234, and second wheels 236 are to be streamed in or out of a device as a unit.

In some implementations, a scene rendered on a particular client device may be based on a perspective of a player associated with the particular client device. For example, in this illustrative example, the scene displayed on client device 215 may be rendered from the perspective of the player associated with virtual character 230, while the scene displayed on client device 220 may be rendered from the perspective of the player associated with virtual character 242, and the scene displayed on client device 225 may be rendered from the perspective of the player associated with virtual character 244.

In some implementations, while rendering a scene on a client device, virtual objects such as virtual characters associated with players, non-player characters (NPCs), virtual tools, virtual accessories, vehicles, trains, etc., may be displayed on a client device based on content streaming rules specified by one or more of a developer user, player user, virtual experience platform, etc.

In some implementations, the display of virtual objects may be based on specific client device capabilities. For example, a scene rendered on a first client device that is a desktop computer may include a display of a larger number of virtual objects than a second client device that is a mobile device, e.g., a smartphone.

In this illustrative example, FIG. 2A depicts client device 215 including a display of virtual character 230*a* (virtual character 230 rendered from the perspective of the player associated with client device 215), skateboard 232*a*, skateboard wheels 234*a*, and skateboard wheels 2366*a*, virtual character 242*a* (virtual character 242 rendered from the perspective of the player associated with client device 215), and virtual character 244*a* (virtual character 244 rendered from the perspective of the player associated with client device 215). However, in this illustrative example, virtual objects corresponding to cart 238, coupler 240, and wagon 242 are not displayed on client device 215 based on content streaming rules, e.g., based on a determination that cart 238, coupler 240, and wagon 242 are positioned at a distance greater than a specified streaming distance from virtual character 232 that is associated with client device 215.

FIG. 2A additionally depicts client device 220 that includes a display of a scene of the virtual environment from the perspective of a player associated with virtual character 242. The display includes virtual character 242*b* (virtual character 242 rendered from the perspective of the player associated with client device 220), virtual character 244*b* (virtual character 244 rendered from the perspective of the player associated with client device 220), as well as cart 238*b*, coupler 240*b*, and wagon 242*b* (cart 238, coupler 240, and wagon 242 rendered from the perspective of the player associated with client device 220). In this illustrative example, virtual character 230, skateboard 232, skateboard wheels 234, and skateboard wheels 236 are not displayed on client device 220 based on content streaming rules, e.g., based on a distance of the virtual objects from the virtual character 242 associated with client device 220.

FIG. 2A also depicts client device 225 that includes a display of a scene of the virtual environment from the perspective of a player associated with virtual character 244. The display includes virtual character 244*c* (virtual character 244 rendered from the perspective of the player associated with client device 225), virtual character 242*c* (virtual character 242 rendered from the perspective of the player associated with client device 225), cart 238*c*, coupler 240*c*, and wagon 242*c* (cart 238, coupler 240, and wagon 242 rendered from the perspective of the player associated with client device 225), virtual character 230*c*, skateboard 232*c*, skateboard wheels 234*c*, and skateboard wheels 236*c*.

In some implementations, a display of the scene on each client device is based on the streaming in and streaming out of virtual objects. The display may be updated (refreshed) at a suitable rate based on changes to the state of virtual objects during the virtual experience.

In some implementations, when streaming is enabled, virtual objects that are outside of a currently streamed area may not be displayed on a screen of the client device. However, in some implementations, lower resolution "imposter" meshes may be utilized to display virtual objects in a streamed out state.

Figure 2B:
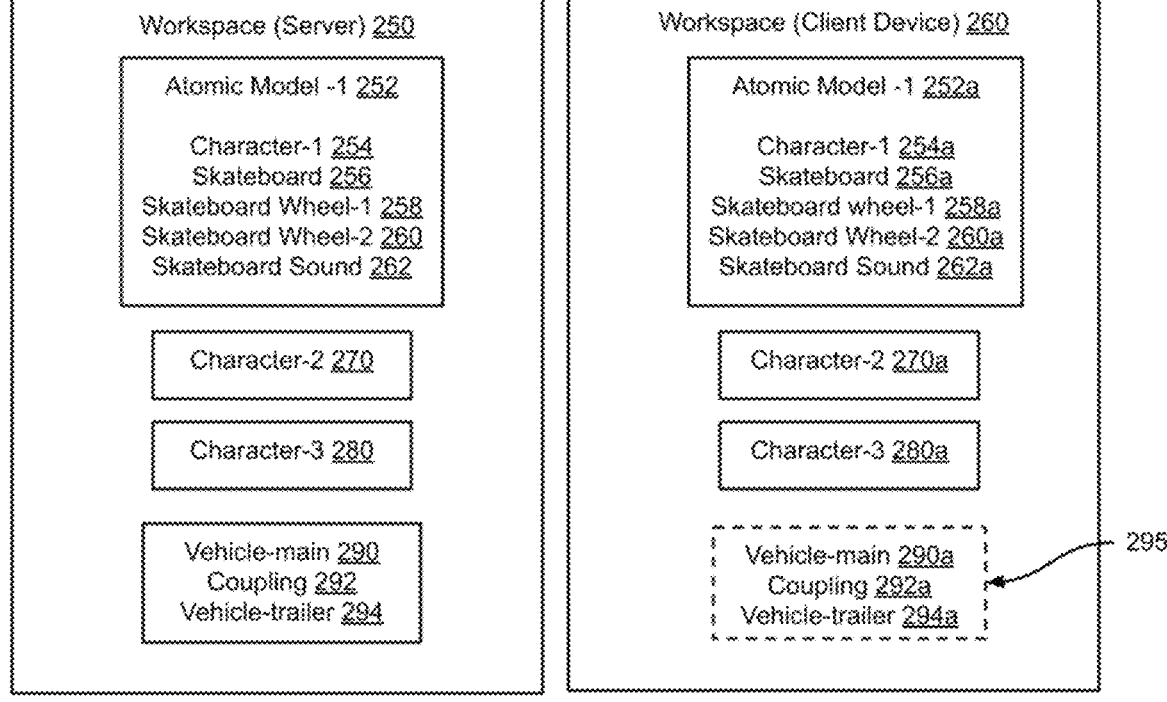
FIG. 2B depicts example variables associated with virtual objects stored in a workspace (memory) of a server device and a workspace (memory) of a client device that correspond to an example scene of a virtual world in a virtual experience, in accordance with some implementations.

FIG. 2B depicts example variables associated with virtual objects stored in a workspace (memory) of a server device and a workspace (memory) of a client device that correspond to an example scene of a virtual world in a virtual experience, in accordance with some implementations.

A virtual world in a virtual environment can include multiple virtual objects, and in order to provide a customized and efficient experience for a user, the virtual environment as viewed by a user on their client device can be dynamically adjusted. This enables a user to view one or more virtual objects that may be relevant to the user experience, while omitting virtual objects that may not be relevant to the user at a particular moment in time.

Efficient rendering is enabled by storing a state of one or more virtual objects in memory (workspace) of a client device. The state of the one or more virtual objects may be received at the client device from a server device, and/or in some cases, may be generated locally at the client devices, from where updates may be provided to the server device and/or to other client devices.

In some implementations, some virtual objects may be transmitted to (and stored in) the workspace (memory) of a client device at a time of a player joining an experience, and some other virtual objects may be transmitted to (and stored in) the workspace (memory) of the client device subsequent to the player commencing participation in the virtual experience based on a context determined in the virtual experience. By loading some variables ahead of time, faster joins may be enabled, and by streaming out and streaming in, memory at a client device as well as network usage may be optimally utilized.

FIG. 2B depicts the workspace (memory) of an example server device 250 and the workspace (memory) of an example client device at a particular time, e.g., a time corresponding to the scene depicted in FIG. 2A. The workspace (memory) of the server device includes a state of all virtual objects in the virtual experience whereas the workspace (memory) of a client device includes the state of virtual objects that may be relevant to that particular client device. The state of the virtual objects may be periodically synchronized between the server and one or more client devices.

In this illustrative example, respective virtual objects included in the server device 250 and client device 260 are depicted. The workspace (memory) of the server device 250 includes atomic model 252 that includes character-1 254 (corresponding to first character 230), skateboard 256 (corresponding to skateboard 232), skateboard wheel-1 258 (corresponding to skateboard wheel 234), and skateboard wheel-2 260 (corresponding to skateboard wheel 236); character-2 270 (corresponding to second character 242); character-3 280 (corresponding to second character 244); Vehicle-main 290 (corresponding to vehicle 238), Coupling 292 (corresponding to coupling 240), and Vehicle trailer 294 (corresponding to coupling 242).

The workspace (memory) of client device 260 includes atomic model 252*a* that includes character-1 254*a* (corresponding to first character 230*a*), skateboard 256*a* (corresponding to skateboard 232*a*), skateboard wheel-1 258*a*

(corresponding to skateboard wheel 234*a*), and skateboard wheel-2 260*a* (corresponding to skateboard wheel 236*a*); character-2 270*a* (corresponding to second character 242*a*); and character-3 280*a* (corresponding to second character 244*a*).

However, the workspace (memory) of client device 260 may no longer include virtual objects associated with the vehicle since they are "streamed out" of the client device. Accordingly, virtual objects 295 that are streamed out, e.g., Vehicle-main 290*a* (corresponding to vehicle 238*a*), Coupling 292*a* (corresponding to coupling 240*a*), and Vehicle trailer 294*a* (corresponding to coupling 242*a*) are removed from the workspace (memory) of client device 260. This enables a greater efficiency of memory utilization on the client device, and additionally reduces the overhead of transmission over a network of the states of variables that have been streamed out to the client device.

FIG. 3 depicts examples of accurately and inaccurately streamed virtual objects, in accordance with some implementations.

In a first example, a vehicle 310 is depicted that includes vehicle body 315, a bonnet assembly 320, and front wheel base 330. In this illustrative example, vehicle 310 is one that is accurately streamed from a server device (not shown) to a client device (not shown).

In contrast, vehicle 350 is one that is inaccurately streamed, and only includes vehicle body 360, while a corresponding bonnet assembly and front wheel base are missing, leading to an inaccurate depiction of vehicle 350.

As depicted in FIG. 3, inaccurate streaming of virtual objects can lead to a poor user experience. With user generated content, and particularly those involving complex virtual characters and complex mechanisms, accurate streaming can pose challenges to a virtual experience platform. Atomic streaming of virtual objects enables accurate streaming in of virtual objects that are crucial to stream in together, and can be utilized to mitigate effects similar to that depicted in the inaccurately rendered car of FIG. 3.

Figure 4:
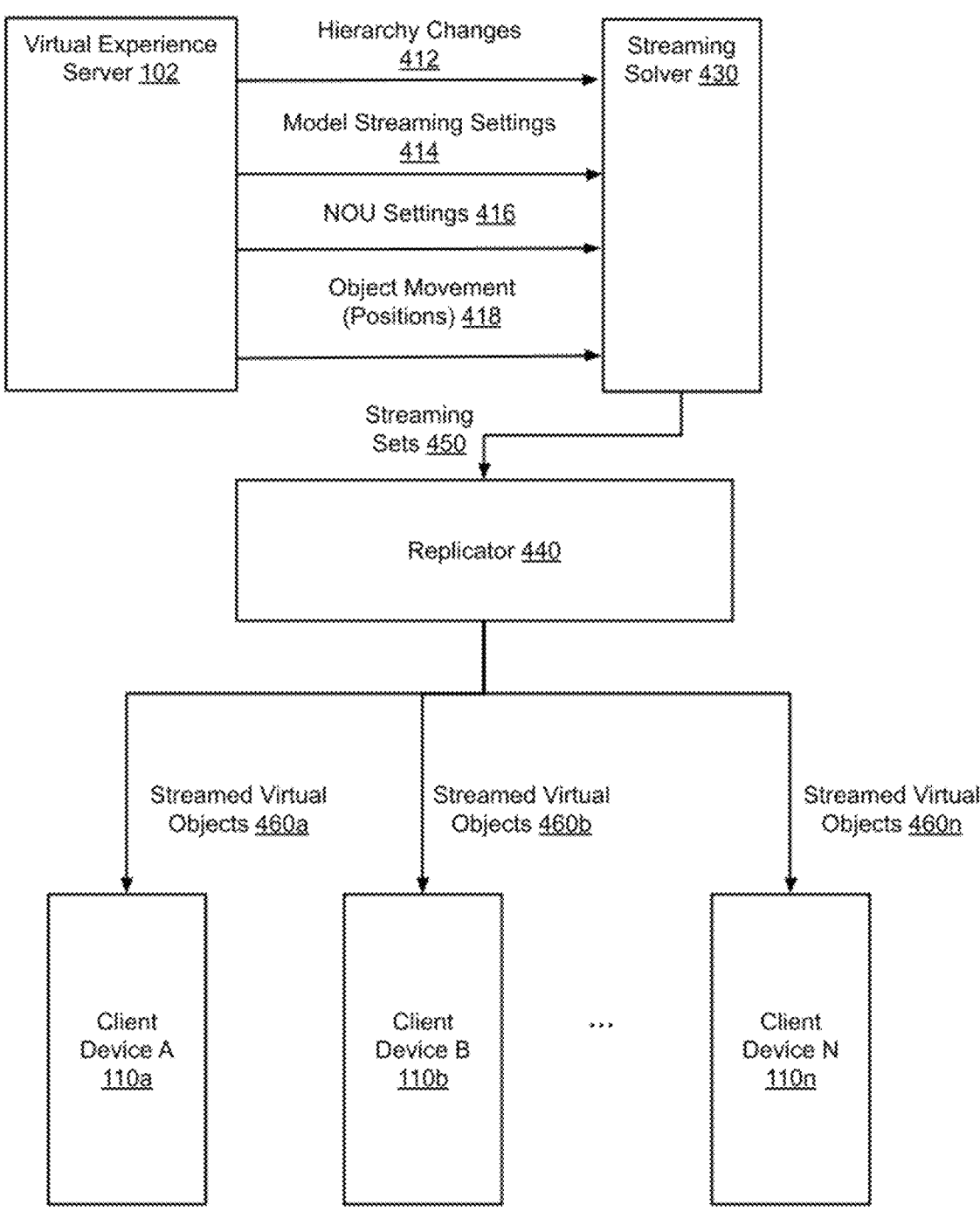
FIG. 4 is a schematic of an example system architecture utilized to perform atomic streaming of virtual objects, in accordance with some implementations.

FIG. 4 is a schematic of an example system architecture utilized to perform atomic streaming of virtual objects, in accordance with some implementations.

As depicted in FIG. 4, the system architecture includes virtual experience server, a streaming solver 430, a replicator 440, and client devices 110.

The streaming solver 430 receives periodic updates regarding the state(s) of one or more virtual objects associated with a virtual experience from the virtual experience server 102. The updates may include hierarchy changes 412 to one or more atomic models, model streaming settings 414, e.g., specified by a user, network ownership unit (NOU) settings 416, and virtual object positions 418.

Based on an analysis of the state(s) of the virtual objects, settings, e.g., developer user settings, etc., the streaming solver 430 determines one or more streaming sets 450 of virtual objects, each of which may include one or more virtual objects. A replicator 440 may be utilized to determine streamed virtual objects 460 to be transmitted to each of one or more client devices based on the streaming sets and parameters/settings associated with the client devices and/or virtual objects, e.g., user streaming preferences, virtual object streaming settings, client device capabilities, etc.

In some implementations, replicator 440 may be architected such that one or more replicators may be assigned to each client device and which may perform the determination on which streaming sets are to be transmitted to the client device. A corresponding replicator may be included in each client device to perform synchronization of a state of one or more virtual objects (via the streaming sets) between the server device and the client device.

FIG. 5 is a flowchart that illustrates an example method to render virtual objects in a virtual experience, in accordance with some implementations.

In some implementations, method 500 can be implemented to perform atomic streaming of one or more virtual objects to client devices as part of a virtual experience, for example, on virtual experience server 102 described with reference to FIG. 1. For example, method 500 may be utilized to render one or more virtual objects on a client device in a virtual experience platform that includes a client-server architecture to support streaming of virtual content. In some other implementations, method 500 can be implemented, for example, on one or more devices described with reference to FIG. 1. In described examples, the implementing system includes one or more digital processors or processing circuitry ("processors"), and one or more storage devices (e.g., a data store 120 or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

Method 500 may begin at block 510. At block 510, a plurality of virtual objects associated with a virtual experience may be obtained, e.g., at a server device. The plurality of virtual objects may include one or more types of virtual objects, e.g., parts, models, images, sound objects, etc.

For example, in some implementations, the plurality of virtual objects may include virtual objects that are parts of an animated virtual character. In another example, the plurality of virtual objects may include a virtual object that is a sound file (sound object), e.g., sound of a gun firing. In another example, the plurality of virtual objects may include a virtual object that is an image file, e.g., a texture that is to be applied to another virtual object. Block 510 may be followed by block 520.

At block 520, physical connections between each virtual object and one or more other virtual objects in the virtual experience are determined.

In some implementations, physical connections for each virtual object of the plurality of virtual objects may be determined by identifying shared constraints between virtual objects. For example, the physical connections may be determined based on an identification of at least one constraint that is shared by two or more virtual objects. For example, it may be determined that a physical connection between a first virtual object and a second virtual object exists based on a determination that the first virtual object and the second virtual object share a common constraint, e.g., a hinge, that at least partially limits (governs) motion of the first virtual object and the second virtual object.

In some implementations, determining the physical connections of the virtual object to the one or more other virtual objects in the virtual experience comprises identifying a network ownership unit assigned to perform physics simulation of the virtual object and the one of more other virtual objects.

In some implementations, physical connections for each virtual object of the plurality of virtual objects may be determined based on a match of a network ownership unit (NOU) associated with the virtual object. For example, it may be determined that a physical connection between a first virtual object and a second virtual object exists based on a determination that the first virtual object and the second virtual object are associated with the same network ownership unit, e.g., a same computing device is assigned to perform physics simulations of the first virtual object and the second virtual object.

Block 520 may be followed by block 530.

At block 530, logical associations of the virtual object and one or more other virtual objects in the virtual experience are determined.

In some implementations, logical associations for each virtual object of the plurality of virtual objects may be determined based on an association of the virtual object with an atomic model and/or a hierarchical association of the virtual object with one or more other virtual objects.

For example, it may be determined that a logical association between a first virtual object and a second virtual object exists based on a determination that the first virtual object and the second virtual object are members of the same atomic model. Similarly, it may be determined that a logical association between a first virtual object and a second virtual object exists based on a determination that the first virtual object is an ancestor object or descendent object of the second virtual object.

In some implementations, determining logical associations of the virtual object to the one or more other virtual objects in the virtual experience may include determining a particular atomic model associated with the virtual object.

In some implementations, determining logical associations of a virtual object to one or more other virtual objects in the virtual experience may include a determination that the virtual object is an ancestor object or a descendent object of the one or more other virtual objects. In some implementations, determining a logical association of a virtual object to one or more other virtual objects in the virtual experience may include performing a match of the virtual object with virtual objects included in a data model hierarchy of virtual objects that is specified/defined by a user as constituting an atomic model of virtual objects. Block 530 may be followed by block 540.

At block 540, streaming sets of virtual objects are formed such that for streaming sets that include two or more virtual objects, each virtual object within the streaming set has one or more of a physical connection and a logical association with at least one other virtual object in the streaming set.

Additionally, in some implementations, streaming sets of virtual objects are formed such that no virtual object included within a first streaming set has a physical connection or logical association with any virtual object included in a second streaming set different from the first streaming set.

In some implementations, a graph-theoretic technique may be applied to determine (form) the streaming sets of virtual objects. For example, in some implementations, a streaming set graph may be constructed that represents the plurality of virtual objects, wherein the graph includes logically associated virtual objects as respective nodes of the graph and the physically connected virtual objects as respective edges.

In some implementations, overlapping virtual objects may be identified in the streaming set graph by performing a depth-first transversal and grouping the overlapping virtual objects.

For example, virtual objects might be organized into groups via grouping constructs such as folders or models. When starting at the ancestor model, associated virtual objects are identified, e.g., by a system, by descending from the model and identifying descendant objects. These descendant objects may also be associated with other objects not under the model in the data structure tree as the result of other types of constraints, such as physics connections and other explicit and/or implicit connections between objects. Other types of associations, such as a script state, may also result in changes to how overlapping or associated objects are related to each other.

In some implementations, the streaming sets of virtual objects are utilized to synchronize a state of virtual objects across client devices participating in the virtual experience on the virtual experience platform, and subsequently to update the rendering of virtual objects on the client devices.

In some implementations, a subset (one or more streaming sets) of the streaming sets may be transmitted from a server device to one or more client devices. In some implementations, transmitting the one or more streaming sets comprises transmitting all of the virtual objects included in the one or more streaming sets to respective client devices.

In some implementations, it may be determined that a state of one or more virtual objects in a streaming set that is to be transmitted to a client device is available to the client device. In such a scenario, the streaming set may be partially transmitted to the client device, wherein the partial transmission to the client device excludes the virtual objects that are already available to the client device. For example, consider a scenario where a client device includes a race car that is being rendered, and a server device causes additional parts, e.g., a spoiler, new wheels, etc. to be attached to the race car. In such a scenario, only the additional objects, and possibly their connections to the existing race car, may need to be transmitted.

In some implementations, determining the one or more streaming sets to be transmitted to each client device may be based on a determination that at least one virtual object in each of the one or more streaming sets to be transmitted to each client device is positioned within a streaming region of the corresponding client device. In some implementations, determining the one or more streaming sets to be transmitted to each client device may be based on overlap of a streaming region associated with the client (local) device and the position in the virtual environment of at least one virtual object in the one or more streaming sets.

In some implementations, a spatial volume for each streaming set may be determined that circumscribes the virtual objects included in the corresponding streaming set. In some implementations, the spatial volume may be defined by an axis aligned bounding box (AABB).

In some implementations, the axis aligned bounding box (AABB) is determined for each streaming set that circumscribes (encloses) the virtual objects included in the corresponding streaming set. The AABB may take into account a total space occupied by a virtual object for virtual objects that have an associated volume. For example, a virtual object, e.g., a sphere may be considered to lie within a streaming region if any portion of the sphere (virtual object) lies within boundaries of a defined streaming region associated with the client device.

In some implementations, it may be determined that a particular streaming set that was previously positioned within a streaming region of a particular client device is no longer positioned within the streaming region of the particular client device. Based on such determination, the particular streaming set may no longer be transmitted to the particular client device. In some implementations, cessation of transmission of a particular streaming set of virtual objects to a particular client device may be implemented such that no virtual object included in the particular streaming set is transmitted to the particular client device. Block 540 may be followed by block 550.

At block 550, virtual objects included in one or more streaming sets in the virtual experience are rendered on a client device.

In some implementations, a comparison may be performed at a client device of virtual objects included in the one or more streaming sets transmitted to the client device with virtual objects stored in a memory of the client device to determine one or more streamed out virtual objects. Based on the comparison, it may be determined that the one or more virtual objects previously stored in the memory of the client device are not included in the streaming set; and based on the determination, the one or more streamed out objects may be removed from the memory of the client device.

Blocks 510-550 can be performed (or repeated) in a different order than described above and/or one or more steps can be omitted. For example, in some implementations, blocks 520 and 530 may be performed in parallel. In some implementations, block 550 may be performed separately from method 500, or not performed at all.

Figure 6:
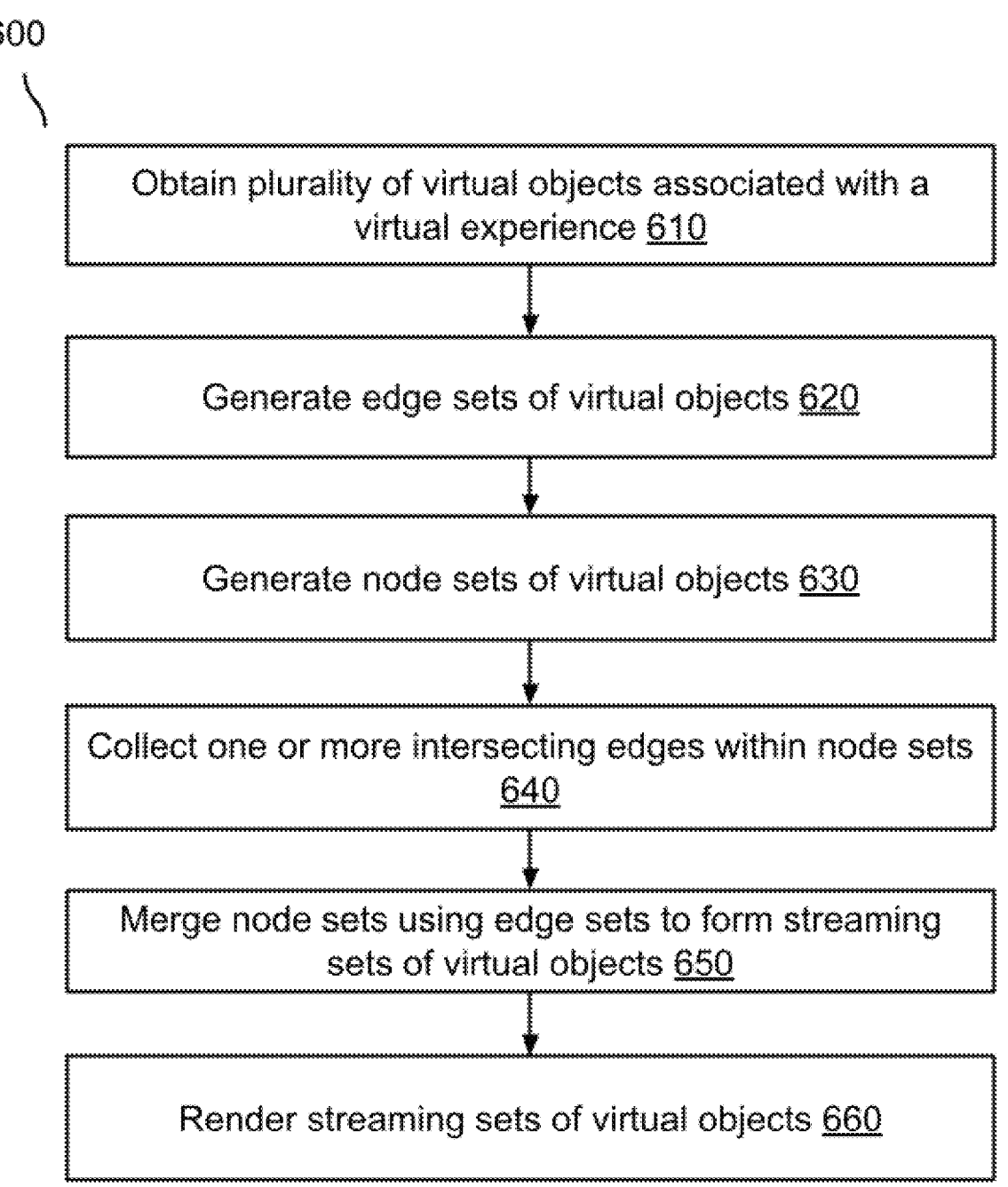
FIG. 6 is a flowchart that illustrates an example method to render virtual objects in a virtual experience, in accordance with some implementations.

FIG. 6 is a flowchart that illustrates an example method to render virtual objects in a virtual experience, in accordance with some implementations.

In some implementations, method 600 can be implemented to perform atomic streaming of one or more virtual objects to client devices as part of a virtual experience, for example, on virtual experience server 102 described with reference to FIG. 1. For example, method 500 may be utilized to render one or more virtual objects on a client device in a virtual experience platform that includes a client-server architecture to support streaming of virtual content. In some other implementations, method 600 can be implemented, for example, on one or more devices described with reference to FIG. 1. In described examples, the implementing system includes one or more digital processors or processing circuitry ("processors"), and one or more storage devices (e.g., a data store 120 or other storage). In some implementations, different components of one or more servers and/or clients can perform different blocks or other parts of the method 600. In some examples, a first device is described as performing blocks of method 600. Some implementations can have one or more blocks of method 600 performed by one or more other devices (e.g., other client devices or server devices) that can send results or data to the first device.

Method 600 may begin at block 610. At block 610, a plurality of virtual objects associated with a virtual experience are obtained.

Block 610 may be followed by block 620.

At block 620, edge sets of virtual objects are determined based on the plurality of virtual objects based on a first association between the virtual objects. Block 620 may be followed by block 630.

At block 630, node sets of virtual objects are determined based on the plurality of virtual objects based on a second association between the virtual objects. Block 630 may be followed by block 640.

At block 640, one or more intersecting edge sets within the node sets may be collected. Block 640 may be followed by block 650.

At block 650, the virtual objects in the node sets may be merged using the edge sets to form streaming sets of virtual objects. Block 650 may be followed by block 660.

At block 660, one or more of the streaming sets of virtual objects may be rendered on a client device.

Blocks 610-660 can be performed (or repeated) in a different order than described above and/or one or more steps can be omitted. For example, in some implementations, blocks 630 and 640 may be performed simultaneously. In some implementations, block 660 may be performed separately from method 600, or not performed at all.

Figure 7:
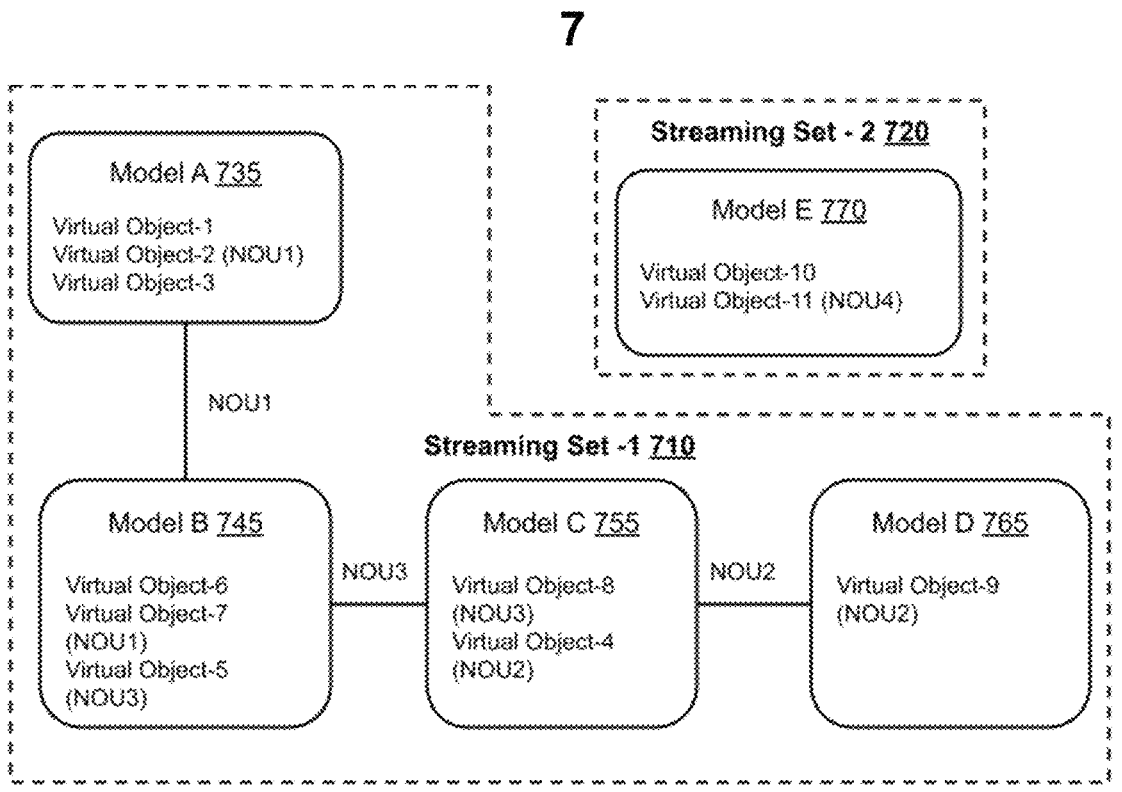
FIG. 7 depicts example streaming sets of virtual objects in a virtual experience, in accordance with some implementations.

FIG. 7 depicts example streaming sets of virtual objects in a virtual experience, in accordance with some implementations.

FIG. 7 depicts an illustrative example wherein streaming sets are formed from a set of 11 virtual objects. A first atomic model (Model A 735), includes Virtual Object-1, Virtual Object-2, and Virtual Object-3. A second atomic model (Model B 745), includes Virtual Object-6, Virtual Object-7, and Virtual Object-5. A third atomic model (Model C 755), includes Virtual Object-8 and Virtual Object-4. A fourth atomic model (Model D 755), includes Virtual Object-9. A fifth atomic model (Model E).

Additionally, in this illustrative example, Virtual Object-2 and Virtual Object-7 are assigned (associated with) to Network Ownership Unit-1 (NOU1); Virtual Object-4 and Virtual Object-9 to NOU2; Virtual Object-5 and Virtual Object-8 to NOU3; and Virtual Object-11 to NOU4.

A streaming solver may be utilized to resolve the virtual objects, e.g., by applying methods 500 or 600 to generate streaming sets, such that each virtual object within the streaming set has one or more of a physical connection and a logical association with at least one other virtual object in the streaming set. Additionally, no virtual object included within a streaming set has a physical connection or logical association with any virtual object included in a different streaming set. Accordingly, two streaming sets are generated from this set of virtual objects.

As depicted in FIG. 7, a first streaming set (Streaming set-1 710) is formed that includes Model A 735, Model B 745, Model C 755, and Model D 765, and a second streaming set (Streaming Set-2 720) is formed that includes Model E 770.

The streaming sets thus formed serve as atomic (indivisible) streaming units (rather than individual virtual objects included in the streaming sets) that are utilized to determine whether to stream in or stream out virtual objects included in the streaming sets.

Figure 8:
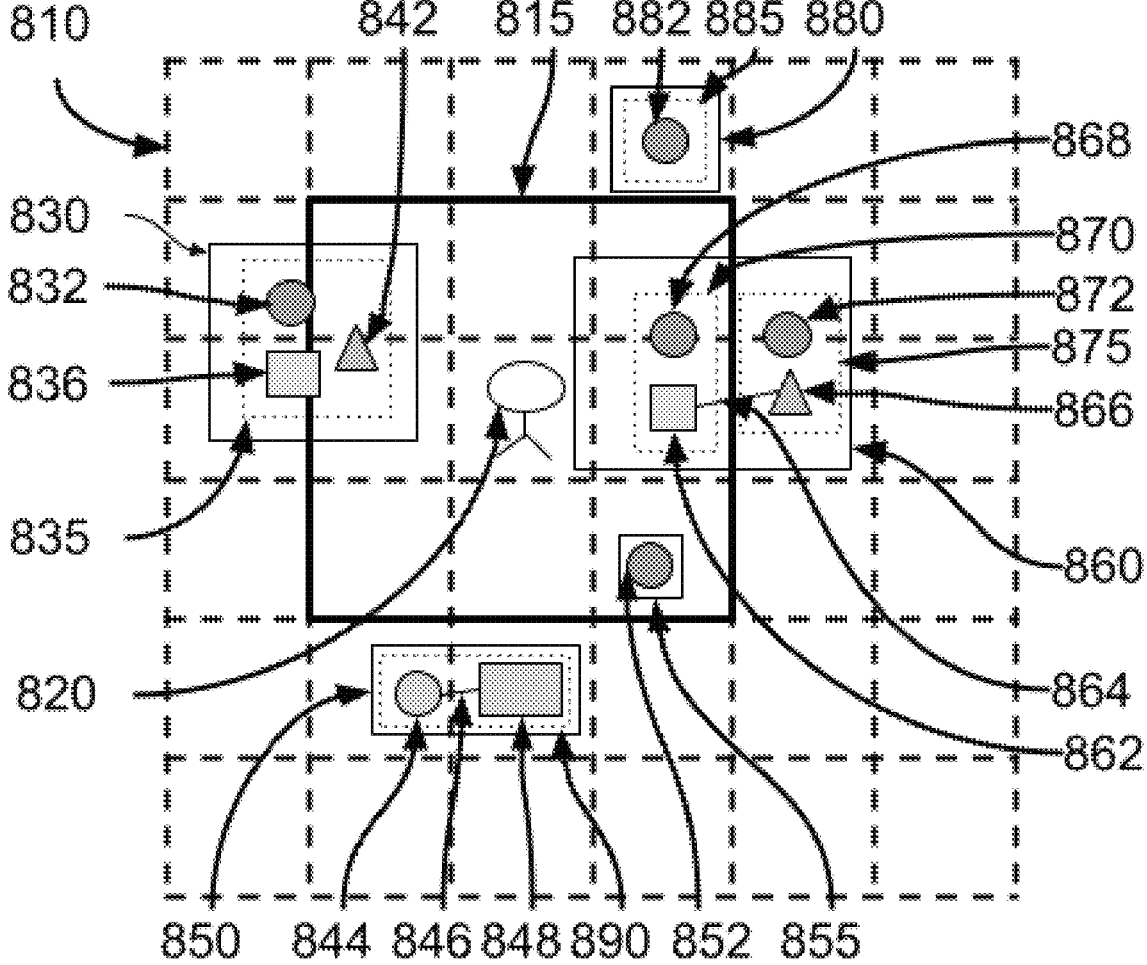
FIG. 8 depicts an example streaming region in a virtual environment, in accordance with some implementations.

FIG. 8 depicts an example streaming region in a virtual environment, in accordance with some implementations.

In this illustrative example, an example virtual environment (e.g., a scene from a virtual world/universe) 810 includes a streaming region 815 associated with a virtual character 820. FIG. 8 additionally depicts a plurality of streaming sets generated for the example virtual universe, e.g., by utilizing one or more of methods 500 and/or 600 based on a plurality of virtual objects associated with the virtual experience.

This illustrative example includes the following atomic models (denoted by a dotted line); a first atomic model 835, a second atomic model 870, a third atomic model 875, a fourth atomic model 880, and a fifth atomic model 890. A designation (specification) of an atomic model and one or more constituent virtual objects may be made at a time of definition/generation of one or more virtual objects by a user, and may be updated subsequently during participation of the user in a virtual experience.

In this illustrative example, atomic model 835 includes virtual object 832, virtual object 836, and virtual object 842; atomic model 870 includes virtual object 862 and virtual object 868; atomic model 875 includes virtual object 866 and virtual object 872; atomic model 880 includes a single virtual object 882; and atomic model 890 includes virtual object 844, virtual object 446, and virtual object 848. In addition to the virtual objects associated with a corresponding atomic model, the virtual environment includes virtual object 852 that is not associated with an atomic model.

In addition to the logical associations between virtual objects defined by associations with a respective atomic model, physical connections between virtual objects are determined based on constraints that connect virtual objects and that limit the motion of the connected virtual objects, e.g., hinges, ropes, joints, etc. In some implementations, virtual objects that are physically connected are assigned to be simulated at a single device, e.g., a client device or server device, that is utilized to simulate motion of the assigned virtual objects. In some implementations, the device assigned to perform physical simulations of a set of connected virtual objects, e.g., by utilizing a physics solver or physics engine, may be referred to as a network ownership unit.

In some implementations, the physical connections between virtual objects may be automatically determined based on a respective network ownership unit associated with the virtual objects. In this illustrative example, virtual object 862 is physically connected to virtual object 866 by virtual object 864; and virtual object 844 is physically connected to virtual object 848 by virtual object 846.

In some implementations, the physical connections may include durable physical connections, e.g., assemblies that include a welded joint between two mechanical components, as well as temporary physical connections, e.g., two avatars holding a rope and pulling in opposite directions in a tug of war contest. In such implementations, a set of virtual objects that are physically connected may be assigned to a same network ownership unit for physical simulation of motion. In some implementations, the network ownership unit is a client device that is associated with the virtual objects in the set of virtual objects that are physically connected. For example, in a scenario of virtual objects (e.g., parts) of a motorcar associated with a particular user, a client device of the particular user may be assigned to be the network ownership unit assigned to the virtual objects. This may enable accurate simulation of motion of the motorcar when compared to performing the simulation at a different device(s) since any effects of the lag that may result due to synchronizing the state of the virtual objects over a network may be mitigated.

Based on the logical associations and the physical connections between virtual objects, a plurality of streaming sets may be determined. The streaming sets can include different configurations of virtual objects and may include atomic models, stand alone virtual objects, physically connected virtual objects, (e.g., assemblies of parts), or combinations of the above.

The streaming sets of virtual objects are formed such that for streaming sets that include two or more virtual objects, each virtual object within the streaming set has one or more of a physical connection and a logical association with at least one other virtual object in the streaming set. Additionally, in some implementations, no virtual object included within a first streaming set has a physical connection or logical association with any virtual object included in a second streaming set different from the first streaming set.

In this illustrative example, based on the specified logical associations and physical connections between the virtual objects in virtual environment 810, streaming sets can be generated, e.g., by utilizing methods 500 or 600. In this illustrative example, the streaming sets include streaming set 830, streaming set 850, streaming set 855, streaming set 860, and streaming set 880.

In some implementations, streaming of virtual objects over the virtual experience platform is based on streaming sets rather than on virtual objects, e.g., the streaming set is utilized as a logical set of virtual objects based on which a determination is made whether a particular streaming set should be streamed to a particular client device.

Based on generated streaming sets of virtual objects that are generated (determined), one or more of the generated streaming sets may be rendered on respective client devices, based on a streaming region associated with each client device. The generated streaming sets may be utilized that all virtual objects in a particular streaming set are streamed in to a client device based on any one of the virtual objects in the particular streaming set meeting an inclusion criterion for being streamed in, and the set of virtual objects streamed out only when all virtual objects in the particular streaming set meet an exclusion criterion for being streamed out.

For example, when at least one part of an assembly is eligible for "streaming in" to a client device, all of the parts of the assembly also "stream in" to the client device, since all the parts of the assembly are included in the same streaming set of virtual objects. Similarly, an assembly may not stream out until all of its parts are eligible for streaming out.

In some implementations, during streaming of virtual content, all of the constraints and attachments that descend from a base virtual object also stream, thereby enabling consistent physics updates on client devices.

In some implementations, the inclusion criterion for a streaming set to be "streamed in" to a client device may be a determination that at least a portion of any of one or more virtual objects included in the streaming set lies inside a streaming region specified for the client device.

In this illustrative example, for the streaming region 815 associated with virtual character 820, the following streaming sets may be streamed in: streaming set 830, streaming set 860, and streaming set 855. It may be observed that the virtual objects being streamed in include individual virtual objects that may be positioned outside the streaming region, e.g., virtual object 872 and virtual object 866.

Virtual objects being streamed in may also include virtual objects that are positioned partially outside the streaming region, e.g., virtual object 832 and virtual object 836. In some implementations, for virtual objects that are part of a streaming set and are associated with a volume (e.g., occupy a space in a virtual environment), the streaming set is transmitted if any portion of any virtual object in the streaming set lies within the streaming region.

When streaming is enabled, virtual objects that are included in streaming sets outside of a currently streamed region (area) are typically not rendered and hence may not be visible at a client device. However, in some implementations, an imposter mode may be utilized wherein one or more virtual objects in a streaming set that is streamed out may be rendered at a lower resolution based on a previously received state for the one or more virtual objects.

Figure 9:
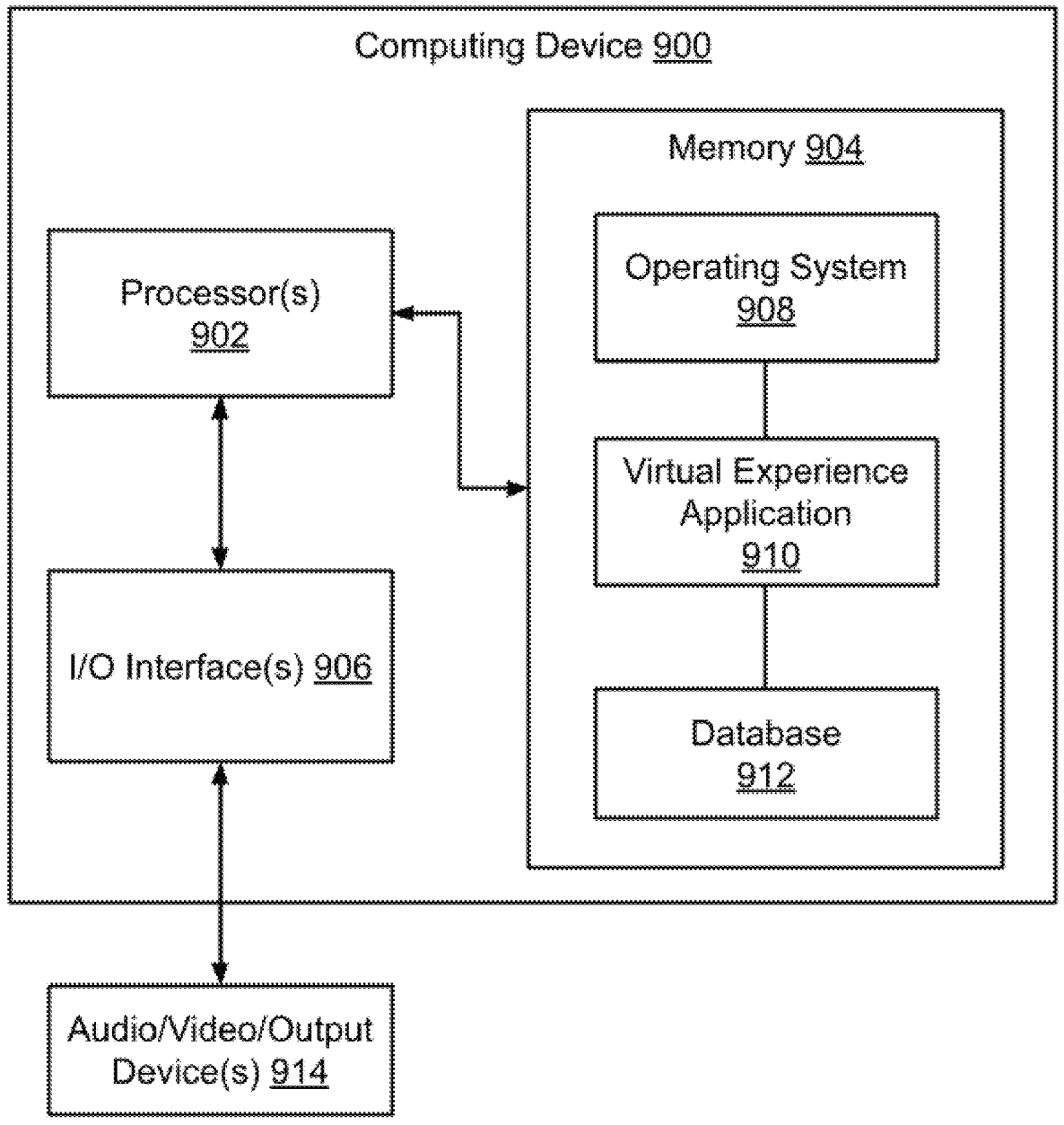
FIG. 9 is a block diagram that illustrates an example computing device, in accordance with some implementations.

FIG. 9 is a block diagram of an example computing device 900 which may be used to implement one or more features described herein. In one example, device 900 may be used to implement a computer device (e.g. 102 and/or 110 of FIG. 1), and perform appropriate method implementations described herein. Computing device 900 can be any suitable computer system, server, or other electronic or hardware device. For example, the computing device 900 can be a mainframe computer, desktop computer, workstation, portable computer, or electronic device (portable device, mobile device, cell phone, smartphone, tablet computer, television, TV set top box, personal digital assistant (PDA), media player, virtual experience device, wearable device, etc.). In some implementations, device 900 includes a processor 902, a memory 904, input/output (I/O) interface 906, and audio/video input/output devices 914.

Processor 902 can be one or more processors and/or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908, one or more applications 910, e.g., a virtual experience application, and application database 912. In some implementations, application 910 can include instructions that enable processor 902 to perform the functions (or control the functions of) described herein, e.g., some or all of the methods described with respect to FIGS. 5 and 6.

Elements of software in memory 904 can alternatively be stored on any other suitable storage location or computer-readable medium. In addition, memory 904 (and/or other connected storage device(s)) can store instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. For example, network communication devices, storage devices (e.g., memory and/or data store 120), and input/output devices can communicate via interface 906. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 914 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 9 shows one block for each of processor 902, memory 904, I/O interface 906, and software blocks of operating system 908 and virtual experience application 910. These blocks may represent one or more processors or processing circuitries, operating systems, memories, I/O interfaces, applications, and/or software engines. In other implementations, device 900 may not have all of the components shown and/or may have other elements including other types of elements instead of, or in addition to, those shown herein. While the virtual experience server 102 is described as performing operations as described in some implementations herein, any suitable component or combination of components of virtual experience server 102 or similar system, or any suitable processor or processors associated with such a system, may perform the operations described.

A user device can also implement and/or be used with features described herein. Example user devices can be computer devices including some similar components as the device 900, e.g., processor(s) 902, memory 904, and I/O interface 906. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 914, for example, can be connected to (or included in) the device 900 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 500 and/or 600) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

We claim:

1. A computer-implemented method to render one or more virtual objects on a client device, the method comprising:

obtaining a plurality of virtual objects associated with a virtual experience;

for each virtual object of the plurality of virtual objects:

determining physical connections of the virtual object to one or more other virtual objects in the virtual experience; and determining logical associations of the virtual object to one or more other virtual objects in the virtual experience;

forming streaming sets of virtual objects, wherein for a streaming set that includes two or more virtual objects, each virtual object within the streaming set has one or more of a physical connection and a logical association with at least one other virtual object in the streaming set;

rendering virtual objects included in one or more streaming sets in the virtual experience on the client device;

performing a comparison of virtual objects included in the one or more streaming sets with virtual objects previously stored in a memory of the client device to identify one or more streamed out virtual objects;

determining, based on the comparison, that one or more virtual objects previously stored in the memory of the client device are not included in the one or more streaming sets; and based on the determination that the one or more virtual objects previously stored in the memory of the client device are not included in the one or more streaming sets, removing the one or more streamed out virtual objects from the memory of the client device.

2. The computer-implemented method of claim 1, further comprising transmitting, from a server device, the one or more streaming sets to the client device.

3. The computer-implemented method of claim 2, further comprising determining the one or more streaming sets to be transmitted to the client device based on a determination that at least one virtual object in each of the one or more streaming sets is positioned within a streaming region of the client device.

4. The computer-implemented method of claim 2, wherein transmitting the one or more streaming sets comprises transmitting the one or more streaming sets such that all virtual objects included in the one or more streaming sets are transmitted to the client device.

5. The computer-implemented method of claim 1, wherein determining the physical connections of the virtual object to the one or more other virtual objects in the virtual experience comprises identifying a network ownership unit defined to perform physics simulation of the virtual object and the one of more other virtual objects.

6. The computer-implemented method of claim 1, wherein determining logical associations of the virtual object to the one or more other virtual objects in the virtual experience comprises determining a particular atomic model associated with the virtual object.

7. The computer-implemented method of claim 1, further comprising determining a spatial volume for each corresponding streaming set that circumscribes virtual objects included in the corresponding streaming set.

8. The computer-implemented method of claim 1, further comprising constructing a graph that represents the plurality of virtual objects, wherein the graph includes logically associated virtual objects as respective nodes of the graph and physically connected virtual objects as respective edges.

9. The computer-implemented method of claim 8, further comprising:

identifying overlapping virtual objects in the graph by performing a depth first transversal; and merging the overlapping virtual objects.

10. The computer-implemented method of claim 1, wherein the plurality of virtual objects comprises one or more of parts, scripts, models, images, and sound objects.

11. A non-transitory computer-readable medium with instructions stored thereon that, responsive to execution by a processing device, cause the processing device to perform operations comprising:

obtaining a plurality of virtual objects associated with a virtual experience;

for each virtual object of the plurality of virtual objects:

determining physical connections of the virtual object to one or more other virtual objects in the virtual experience; and determining logical associations of the virtual object to one or more other virtual objects in the virtual experience;

forming streaming sets of virtual objects, wherein for a streaming set that includes two or more virtual objects, each virtual object within the streaming set has one or more of a physical connection and a logical association with at least one other virtual object in the streaming set;

rendering virtual objects included in one or more streaming sets in the virtual experience on a client device;

performing a comparison of virtual objects included in the one or more streaming sets with virtual objects previously stored in a memory of the client device to identify one or more streamed out virtual objects;

determining, based on the comparison, that one or more virtual objects previously stored in the memory of the client device are not included in the one or more streaming sets; and based on the determination that the one or more virtual objects previously stored in the memory of the client device are not included in the one or more streaming sets, removing the one or more streamed out virtual objects from the memory of the client device.

12. The non-transitory computer-readable medium of claim 11, wherein the operations further comprise transmitting, from a server device, the one or more streaming sets to the client device.

13. The non-transitory computer-readable medium of claim 12, wherein the operations further comprise determining the one or more streaming sets to be transmitted to the client device based on a determination that at least one virtual object in each of the one or more streaming sets is positioned within a streaming region of the client device.

14. The non-transitory computer-readable medium of claim 12, wherein transmitting the one or more streaming sets comprises transmitting the one or more streaming sets such that all virtual objects included in the one or more streaming sets are transmitted to the client device.

15. The non-transitory computer-readable medium of claim 11, wherein determining the physical connections of the virtual object to the one or more other virtual objects in the virtual experience comprises identifying a network ownership unit defined to perform physics simulation of the virtual object and the one of more other virtual objects.

16. The non-transitory computer-readable medium of claim 11, wherein determining logical associations of the virtual object to the one or more other virtual objects in the virtual experience comprises determining a particular atomic model associated with the virtual object.

17. A system comprising:

a memory with instructions stored thereon; and a processing device, coupled to the memory, the processing device configured to access the memory and execute the instructions, wherein the instructions cause the processing device to perform operations including:

obtaining, at a client device, a plurality of virtual objects associated with a virtual experience;

for each virtual object of the plurality of virtual objects:

determining physical connections of the virtual object to one or more other virtual objects in the virtual experience; and determining logical associations of the virtual object to one or more other virtual objects in the virtual experience;

forming streaming sets of virtual objects, wherein for a streaming set that includes two or more virtual objects, each virtual object within the streaming set has one or more of a physical connection and a logical association with at least one other virtual object in the streaming set;

rendering virtual objects included in one or more streaming sets in the virtual experience on the client device;

performing a comparison of virtual objects included in the one or more streaming sets with virtual objects previously stored in a memory of the client device to identify one or more streamed out virtual objects;

determining, based on the comparison, that the one or more virtual objects previously stored in the memory of the client device are not included in the one or more streaming sets; and based on the determination that the one or more virtual objects previously stored in the memory of the client device are not included in the one or more streaming sets, removing the one or more streamed out objects from the memory of the client device.

18. The system of claim 17, wherein the plurality of virtual objects comprises one or more of parts, scripts, models, images, and sound objects.

19. The system of claim 17, wherein the operations further comprise include constructing a graph that represents the plurality of virtual objects, wherein the graph includes logically associated virtual objects as respective nodes of the graph and physically connected virtual objects as respective edges.

\* \* \* \* \*